United States Patent
Dassoulas et al.

(10) Patent No.: US 7,117,863 B1
(45) Date of Patent: Oct. 10, 2006

(54) SAW BLADE FOR CUTTING FIBER CEMENT

(75) Inventors: Stephen C. Dassoulas, Lutherville, MD (US); John R. Curtsinger, Shelbyville, KY (US); Stefan Nock, Baltimore, MD (US); Dean Edwards, Bel Air, MD (US); Michael Lindberg, deceased, late of Rockville, MD (US); by Laura Lindberg, legal representative, Rockville, MD (US); Steve McClaskey, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/890,164

(22) PCT Filed: Jan. 24, 2000

(86) PCT No.: PCT/US00/01609

§ 371 (c)(1),
(2), (4) Date: Mar. 22, 2004

(87) PCT Pub. No.: WO00/43179

PCT Pub. Date: Jul. 27, 2000

Related U.S. Application Data

(60) Provisional application No. 60/117,145, filed on Jan. 25, 1999.

(51) Int. Cl.
*B28D 1/04* (2006.01)
*B23F 21/03* (2006.01)
*B02C 23/18* (2006.01)

(52) U.S. Cl. .................. 125/13.01; 125/15; 451/541; 451/546; 451/547

(58) Field of Classification Search ............... 451/488, 451/541, 546, 547; 125/13.01, 15
See application file for complete search history.

(56) References Cited

U.S. PATENT DOCUMENTS

| | | | |
|---|---|---|---|
| 3,122,030 A | * | 2/1964 | Metzger .................. 76/112 |
| 3,133,579 A | | 5/1964 | Sprague |
| 4,187,754 A | * | 2/1980 | Beaty ..................... 83/847 |
| 4,345,579 A | | 8/1982 | Eichenlaub et al. |
| 4,462,382 A | * | 7/1984 | Baron et al. ............... 125/15 |

(Continued)

*Primary Examiner*—Eileen P. Morgan
(74) *Attorney, Agent, or Firm*—Harness, Dickey & Pierce, P.L.C.

(57) ABSTRACT

An improved circular saw blade designed for cutting fiber cement workpieces, which are becoming more and more prevalent on the construction site, includes a PCD/carbide tip (16) mounted in the rim (31) of the saw blade (10) at six, rather than the usual for locations, equally spaced around the blade. The tips are mounted adjacent a relatively large-diameter, semi-circular gullet (20), which itself is preceded by a chip and dust minimizer (18). The minimizer includes several alternating hills (52) and valleys (54) formed in the rim of the saw blade, each hill and valley having the same radius, producing a sinuous array essentially centered on the rim of the blade. It has been discovered that such a dust and chip minimizer reduces the level of dust and chips produced by the blade and clears the same from the kerf generated in the blade-workpiece interface. Ideally, all of the parameters and relief angles for the surfaces on the saw blade tip can be generated by cutting an array of such tips from a large-diameter blank (110) of PCD fused to a layer of tungsten carbide (72), and by mounting the tips onto the blade in such an orientation as to present, preferably, a negative hook or rake angle (74) to the workpiece.

20 Claims, 5 Drawing Sheets

U.S. PATENT DOCUMENTS

| | | |
|---|---|---|
| 4,583,515 A | 4/1986 | Ballenger |
| 4,867,025 A * | 9/1989 | Eklof et al. .................... 83/835 |
| 5,555,788 A | 9/1996 | Gakhar et al. |
| 5,829,423 A * | 11/1998 | Benz ........................... 125/15 |
| 5,896,800 A | 4/1999 | Curtsinger et al. |
| 6,067,888 A * | 5/2000 | Achterberg et al. ........... 83/835 |
| 6,626,167 B1 * | 9/2003 | Kim et al. ..................... 125/15 |
| 6,729,220 B1 * | 5/2004 | Curtsinger et al. ........... 83/666 |
| 6,752,141 B1 * | 6/2004 | Bertolet ........................ 125/15 |
| 6,845,767 B1 * | 1/2005 | Sakarcan ...................... 125/15 |
| 6,872,133 B1 * | 3/2005 | Lee et al. .................... 451/546 |

\* cited by examiner

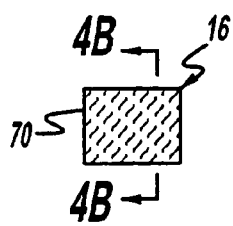
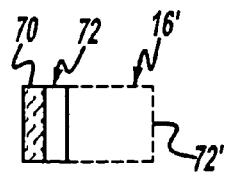
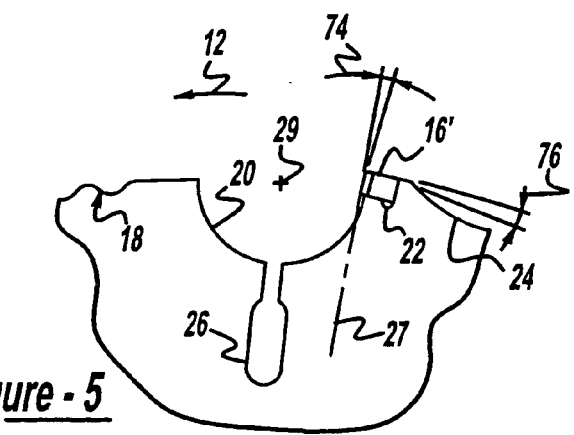
*Figure - 4A*    *Figure - 4B*    *Figure - 5*
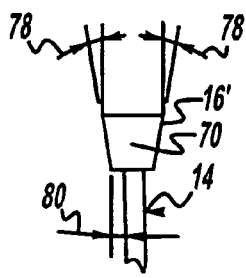
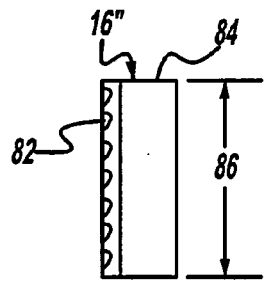
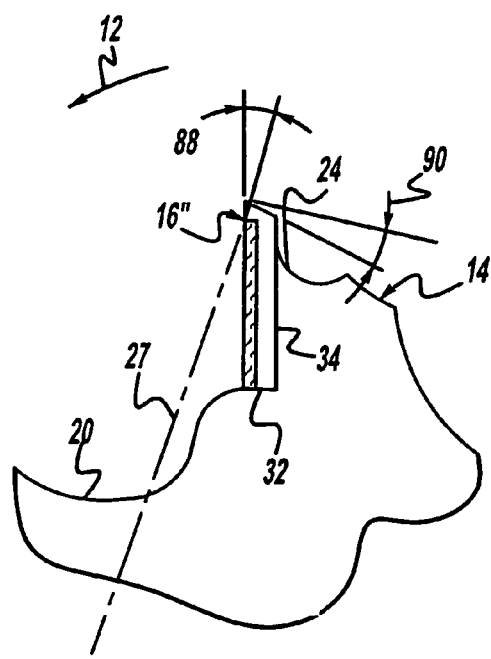
*Figure - 6*    *Figure - 7*    *Figure - 8*

SAW BLADE FOR CUTTING FIBER CEMENT

BACKGROUND OF THE INVENTION

Fiber cement products are becoming more and more common on construction sites. As such there has arisen a demand for cutting tools, particularly circular saw blades, that can cut this very difficult material, while reducing the amount of fine dust particles generated. A need also exists for such blades that yield a high quality (straight and smooth) cut in fiber cement workpieces. There has also arisen a need for such blades that are less expensive to produce than conventional diamond blades, but which still exhibit good wear characteristics. Finally, there is a perception by users that conventional blades for cutting fiber cement products, particularly blades with conventional tips formed with polycrystalline diamond joined to tungsten carbide ("PCD") don't "feel" right.

In the conventional manufacturing process, a PCD tip is attached to the rim of the blade blank at four circumferentially equidistant locations, by brazing the carbide portion to the steel blade blank. Frequently, diamond elements are formed and machined, then applied to pre-formed carbide substrates, or, in the alternative, a diamond film is deposited on the carbide tips using a chemical vapor deposition process. One relatively recent process for forming a PCD tip is to cut several parts out of a large PCD blank, in which the PCD has already been fused to a carbide layer or substrate. Another conventional process is to form the PCD tip, braze it to the blade, then machine the radial or side clearances, the tangential clearances, and the top relief or clearance for each tip. In view of the wear resistance inherent in the diamond and carbide materials selected, this amount of machining is a slow, expensive process.

As to the structure of a conventional blade for fiber cement, conventional wisdom dictates using a positive hook angle for the tip. This has not proved to be entirely satisfactory. Further, the conventional design employing four tips doesn't provide a good finish, nor does it provide the user with a good "feel".

SUMMARY OF THE INVENTION

The present invention solves the cost problem and makes the PCD blade capable of cutting a difficult substance like fiber cement. It also makes it possible for the blade to be priced for the consumer, rather than as a high-end specialty product. One way in which the invention is created is to cut the appropriate relieved tooth form out of the PCD/carbon-fused blank or sandwich and then mount the PCD tooth form or tip to the saw blade blank in such a way as to eliminate any further grinding step. Another is to form a relatively large diameter blank of PCD/carbide, and then to form an array of relieved saw blade tips in the blank, such as by EDM cutting, so that, in one embodiment, radially-relieved surfaces of each tip are immediately adjacent the opposite side radially-relieved surface of another tip. Another embodiment of the process of the present invention is to form a PCD/carbide tip in a "square" configuration, such as 0.090 inches by 0.090 inches by 0.125 inches, then connecting the tip to the blade blank, and then grinding the top, radial and tangential relief surfaces in place. Or, it may be desirable to orient the tip on the blade in such a way that the tip needs no grinding to form the desired top relief, and using diamond grinding wheels to grind simultaneously the radial and tangential clearance (relief) surfaces with the tip fixed in place on the blade. Both approaches of the process of the present invention eliminate the conventional need for attaching a pre-formed PCD layer to match the configuration of each carbide tip.

Another aspect of the process of the present invention is to form a rounded dished portion in the shoulder of a saw blade rim where the corner of the PCD tooth is normally mounted. This reduces voids in the braze between the carbide portion of the PCD sandwich and the metal rim of the saw blade. It also improves alignment of the tip to the plate, because it eliminates the gullet that would otherwise interfere with the sharp corner at the bottom rear of the tip. Finally, yet another aspect of the process of the present invention is optionally to form a shallow depression in the saw blade rim behind the tip so that there will be sufficient clearance in the event it is desired to top-grind both the tip and a portion of the blade steel immediately adjacent the rear of the tips, at the rim of the blade. This may not be necessary, if the blade is laser-cut from steel strip or sheet. Now follows a discussion the blade of the present invention.

Recognizing that conventional blades for cutting fiber cement limit the number of teeth to four, because it is believed that fewer teeth generate smaller amounts if fine-particle dust, and further recognizing that four teeth do not satisfactorily clear or minimize the chips and dust packed into the blade—fiber cement interface, the blade of the present invention includes chip and dust minimizers preferably, one in front of each tooth (in the direction of cut of the saw blade). The minimizers of the present invention are created by a sinuous pattern of a plurality of adjacent radially-extending alternating peaks and valleys formed in the rim of the saw blade blank. In a preferred embodiment, each minimizer includes three distinct "hills", each hill separating two "valleys", such that the sinuous pattern begins and ends with a valley. The result is a pattern of three hills interspersed among four valleys. Such a minimizer has been found to reduce the amount of chips and dust in the blade-workpiece interface. The minimizers coact with another feature of the blade of the present invention, namely, adjacent, substantially semi-circular, large-diameter gullets at each tip location on the saw blade rim, to further reduce the level of dust.

Yet a further object of the blade of the present invention is to locate six, not four, sets of PCD tips, gullets and minimizers about the rim of the blade. This has resulted in a significant improvement in the quality of cut in fiber cement workpieces.

Finally, a further object of the present invention is to orient the PCD/carbide tips of the present invention in their respective locations in the rim of the saw blade so that the tips present a negative hook or rake angle to the workpiece, as opposed to the conventional positive-hook saw blades for cutting fiber cement. The negative-hook orientation of the saw blade tips of the present invention also contributes to the better feel and finish of the blades of the present invention.

Other objects, features and advantages of the present invention will become more fully apparent from the following detailed description of the preferred embodiments, the appended claims, and the accompanying drawings.

BRIEF DESCRIPTION OF THE DRAWINGS

In the accompanying drawings, in which like reference characters in the same or in different Figures, indicate like parts:

FIG. 4A is a front elevational detail view of a square PCD/carbide tip of the present invention;

FIG. 4B is a sectional view, taken along the line B—B of FIG. 4A, the dashed lines indicating another embodiment of the PCD/carbide tip of the present invention;

FIG. 5 is a side elevation of the PCD/carbide tip of FIG. 4B placed in a saw blade blank of the present invention at a predetermined negative hook angle, and after having the top clearance angle ground;

FIG. 6 is a fragmentary, front elevational view of the invention shown in FIG. 5, after the side (radial) and tangential relief surfaces have been ground;

FIG. 7 is a side elevational view of a pre-cut PCD tip of another embodiment of the present invention;

FIG. 8 is a side elevational view of the pre-cut PCD tip of FIG. 7 assembled to a saw blade adjacent a gullet at a predetermined positive rake angle;

DETAILED DESCRIPTION OF THE PREFERRED EMBODIMENTS

Figure 1:
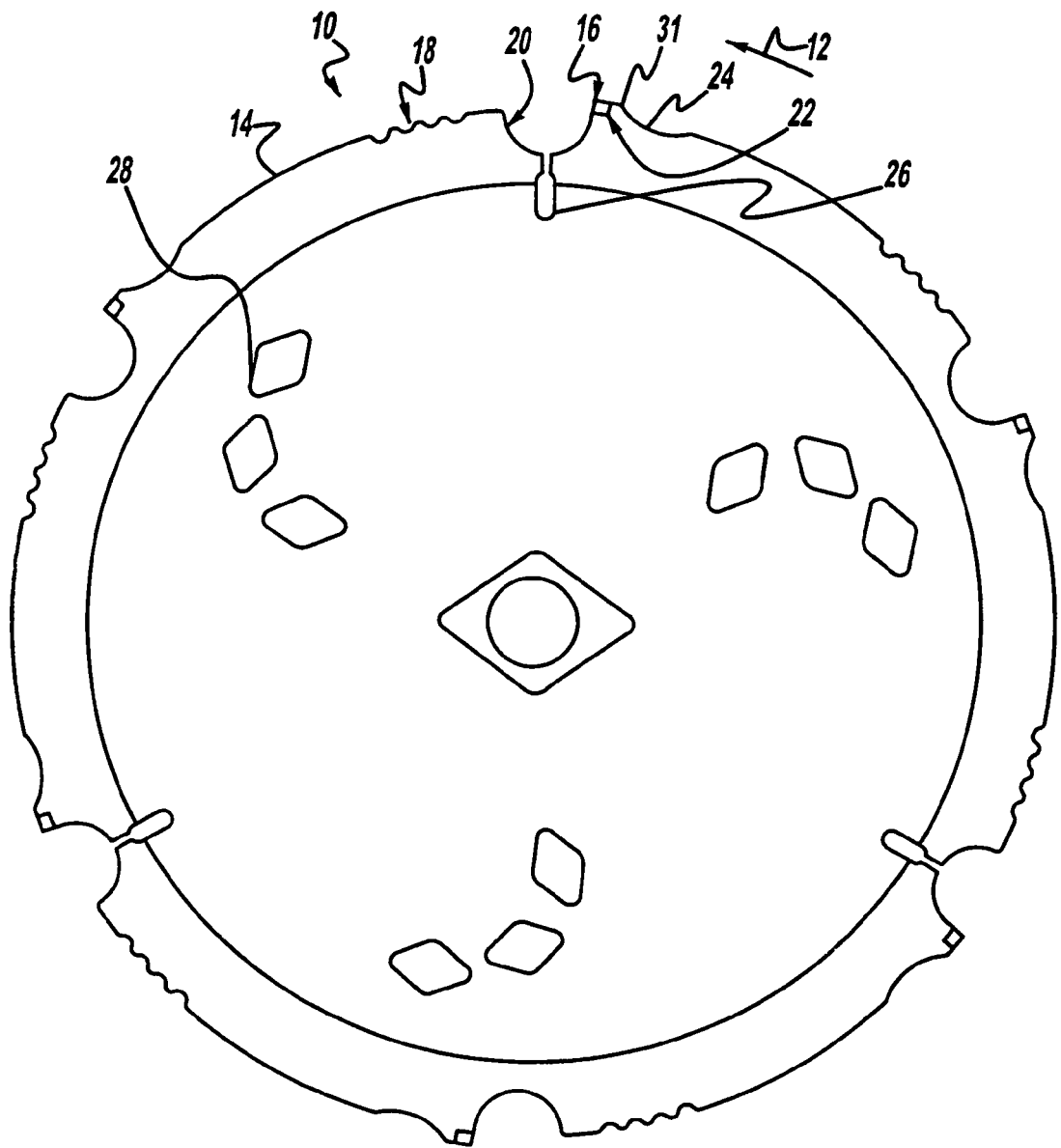
FIG. 1 is a top plan view of a circular saw blade formed according to the present invention showing the minimizers, gullets and tips of the present invention.

Referring to FIG. 1, the saw blade of the present invention is referred to generally as 10. The saw blade 10 rotates in the direction shown by arrow 12 when mounted to a saw. The saw blade is formed of a steel plate or blank 14 on which is mounted a plurality of tips 16, where are formed of harder material, such as a fusion of PCD and tungsten carbide (hereinafter referred to as PCD/carbide). The thickness of the steel plate 14 is in the range of from 0.061 inches to 0.065 inches, with the preferred thickness being 0.063 inches. In the preferred embodiment of the circular saw blade 10 of the present invention, the blade itself is cut from sheet or plate steel by a laser process, and then the PCD/carbide tips 16 are brazed to the blade rim 31 in selected locations. Preceding the tip 16 in the direction of rotation 12, is a chip and dust limiter 18, immediately followed by a sweeping (relatively large diameter) gullet 20 for also removing dust. The rim is further formed with a dished area, decreasing the likelihood that there will be any voids in the brazed itself, and assisting in providing proper alignment between the tip and the blade. In addition, a shallow depression 24 is formed in the rim 31 immediately behind the tip 16, in the event that, during the manufacturing process, it is desired to grind both the top face of the tip and a portion of the rim simultaneously. Depression 24 provides a clearance for the grinding wheel. Opening into every other gullet is an expansion slot 26, which minimizes warpage in the blade during the manufacturing process. In addition, heat vents 28 of a predetermined configuration and array are also formed in the blade. In FIG. 1, all of the gullets 20, tips 16, and dust and chip minimizers 18 are the same. At this point it should be noted, that contrary to the conventional approach of using no more than four teeth on a saw blade for cutting fiber cement workpieces, the saw blade 10 of the present invention uses six equally-spaced sets of teeth gullets and dust/chip minimizers. The use of 50% more teeth has resulted in significantly improved quality of cut in the workpiece, in that the cut is straighter and has a smoother finish. For a more detailed description of this portion of the saw blade, reference is now made to FIG. 2.

Figure 2:
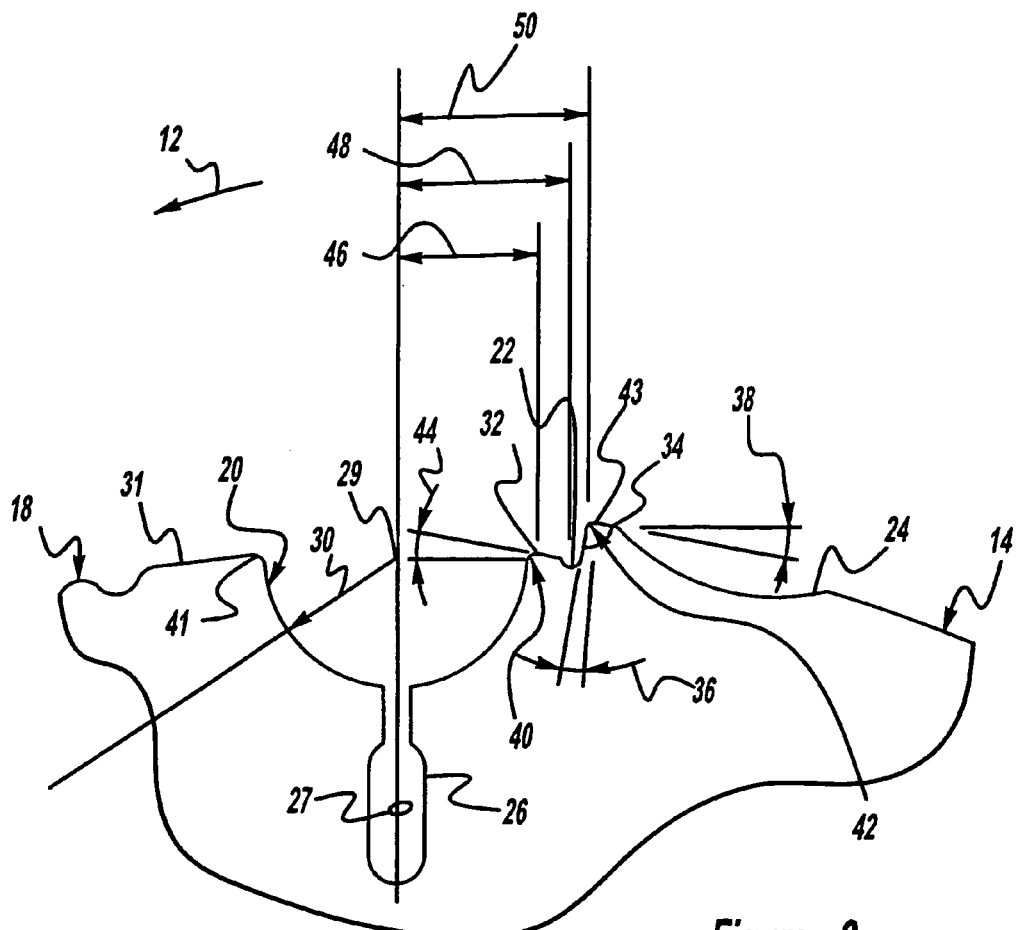
FIG. 2 is an enlarged detail schematic view of one portion of the saw blade of FIG. 1, showing the shelf and dished area adjacent a gullet, prior to installing a PCD/carbide tip therein, and a portion of the minimizer of the present invention.

As shown in FIG. 2, gullet 20 is centered about point 29, which lies on a radial 27 going through the center of the saw blade, and bisecting expansion slot 26. The center 29 is located slightly radially inwardly of the circumference of the outer rim 31 and, preferably, is substantially semicircular in profile, having a radius 30 of about 8 mm. A shelf 32 is formed in the rim 31 adjacent the trailing end of the gullet 20 at a shelf inclination angle 44 of about 10 degrees. The shelf is joined to a backing portion 34 by dished area 22, and together provide the mounting support for a tip 16 when brazed into place on the rim. The backing 34 is formed at a negative rake angle 36 of about 10 degrees, while the top surface relief angle 38 is also about 10 degrees. The radius of the interface 40 between the gullet rim 20 and the rim 31 is about 0.51 mm, and the radius 42 of the interface 43 between the backing 34 and the rim 31 is about 0.25 mm. The shelf inclination angle 44 is also set at about 10 degrees. These dimensions are selected to coact with the various dimensions and angles of the tip 16 so that, in one embodiment of the present invention, the tip brazed in place on the shelf 32 and against the backing 34 is at an orientation that requires no further machining of the saw blade or tip. On the other hand, if desired, the various dimensional parameters and angles of the tip 16 of the present invention and the saw blade 10 of the present invention can be selected so that one or more grinding operations can be performed on the tip after emplacement in the saw blade. The distance 46 from radial 27 to center 40 of the interface 41 is approximately 8 mm, while the distance 48 from the radial 27 to the center of the dished portion 22 is about 9.9 mm. Finally, the distance 50 from the radial to the center of interface 43 is about 11 mm. It can be noted that the radius 30 of gullet 20 is relatively large in comparison to the size of the tip 16. This aids in dust and chip removal, and reduces the amount of fine-particle dust.

Figure 3:
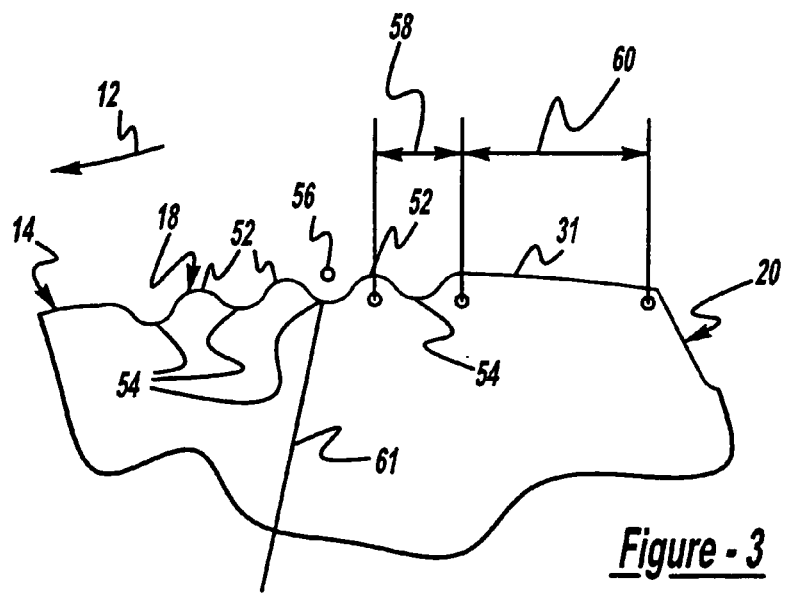
FIG. 3 is an enlarged schematic detail view of a minimizer of the present invention adjacent a portion of a gullet.
Figure 9:
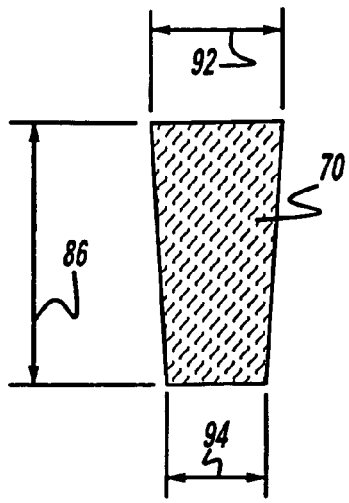
FIG. 9 is an enlarged detail view of the radial relief of the saw blade tooth shown in FIG. 7.

Now referring to FIG. 3, a more detailed description of the dust and chip minimizers 18 of the present invention will follow.

It has been discovered that the use of dust and chip minimizers of the present invention reduce the amount of dust and chips generated or present in the blade-kerf interface. The dust and chip minimizer 18 of the present invention, illustrated earlier in FIG. 3, includes a plurality of hills 52 interspersed in equal distance among valleys 54, such that, in a preferred embodiment, there are three hills 52 interspersed equidistantly from and among four valleys 54. It should be noted that all of the hills and valleys 52,54 are semicircular in shape and centers 56 are spaced apart equidistantly. The result is a sinuous array of hills and valley 52,54, respectively, separated from an interface with gullet 20 by a distance 60, which is about 0.364 inches. The distance 58 between centers of hills (and between centers of valleys) is about 0.172 inches. The preferred radius 61 of the hills and valleys of the minimizer 18 of the present invention is about 0.050 inches. It is believed that reducing the number of hills and valleys will reduce the dust-clearing action of the minimizer 18. It is also believed, however, that there will exist some upper limit to the hills and valleys beyond which further increases in the quantity of hills and valleys will result in a relatively small, if any, reduction in dust production.

Moving now to the PCD/carbide tip of the present invention, one embodiment is illustrated in FIGS. 4A, 4B, 5 and 6. Here a tip 16 is formed in a "square" configuration with a PCD layer 70 joined to a tungsten carbide layer 72. In one embodiment, the length and width of the tip shown in FIG. 4A is about 0.090 inches square, and the depth of the embodiment shown in solid lines in FIG. 4B is about 0.060 inches. However, it has been discovered that to provide a greater surface area and consequently a greater amount of interface between the bottom portion of the tip and the shelf 32, such as by making the total depth 0.125 inches, as shown in phantom and designated 16' and 72' in FIG. 4B, there is a better and stronger brazed connection between the tip 16' and the saw blade 14. As shown in FIG. 5, the square tip 16' is oriented on the rim 31 of the saw blade so that the cutting edge is automatically at a negative rake angle 74 of about negative 5 degrees and a back angle 76 of also about 5 degrees. FIG. 6 illustrates the tip 16' after the side clearance angles 78 have been ground, these angles being in the range of about 0.001 inches to 0.005 inches, for each side. In addition, the tip 16' is oriented on the blade 14 that there is an overhang 80 of about 0.013 inches on each side of the blade 14.

Figure 10:
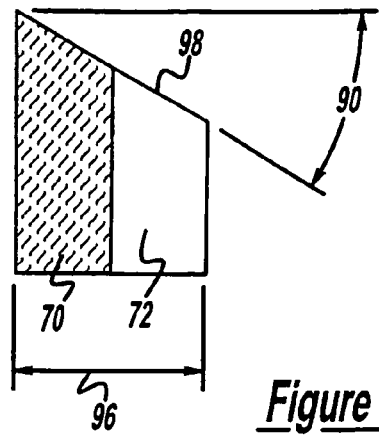
FIG. 10 is a side elevational detail view of the pre-cut tip shown in FIG. 9 with the pre-cut top relief of 30 degrees, prior to being rotated forwardly about 15 degrees, as shown in FIG. 8, thereby yielding a top clearance angle of about 15 degrees.

FIGS. 7 through 10 illustrate another embodiment of the present invention, in which a pre-cut PCD/carbide tip 16" is formed to a height 86 of about 0.175 inches, a width 92 at the top of about 0.083 inches, and a width 94 at the bottom of about 0.065 inches. Referring now to FIG. 10, the depth 96 is about 0.125 inches and the pre-cut top clearance angle 90 is about 30 degrees, thereby providing a relieved top surface 98. With reference to FIG. 8, the tip 16" is mounted on the blade 14 such that the hook angle 88 is at a positive 15 degrees relative to the radial 27. Although the range of acceptable hook angles of the present invention is from minus 7 degrees to plus 10 degrees, a negative hook angle is preferred.

Figure 11:
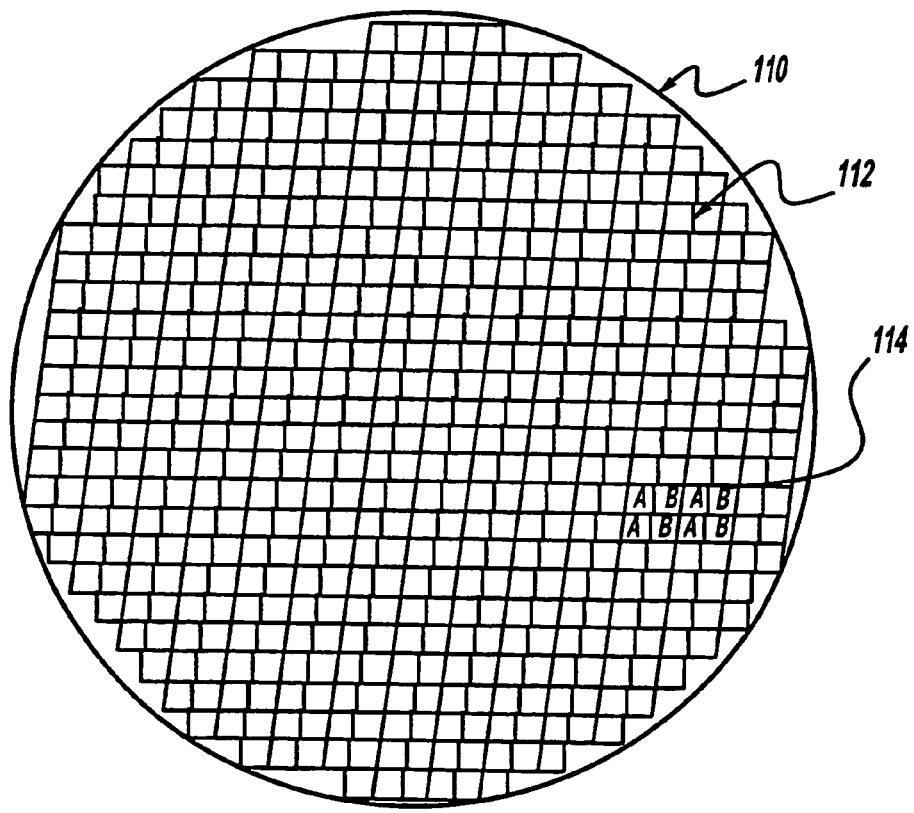
FIG. 11 is a schematic plan view of a large circular blank of a PCD/carbide sandwich or fusion showing an array of PCD/carbide tips formed according to the present invention.

With reference now to FIG. 11, a large blank 10 of PCD material fused to carbide is illustrated, which is then cut into an array 112 of oppositely oriented tips 114. The large diameter blank 110 is, for example, supplied by General Electric as their Compax Grade 1300 PCD blank.

Figure 12A:
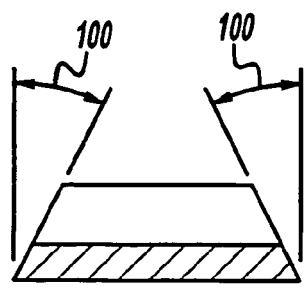
FIG. 12A is a top plan schematic view of another embodiment of the saw blade tip of the present invention, in which all of the relief angles have either been formed in the tip prior to its connection to the saw blade blank, or are created by the predetermined attitude of the tip when secured in place on the saw blade blank.
Figure 12B:
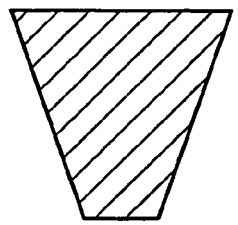
FIG. 12B is a front elevational schematic view of the tip shown in FIG. 12A.
Figure 12C:
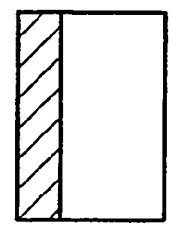
FIG. 12C is a side elevational schematic view of the PCD saw blade tip of FIG. 12A.
Figure 13:
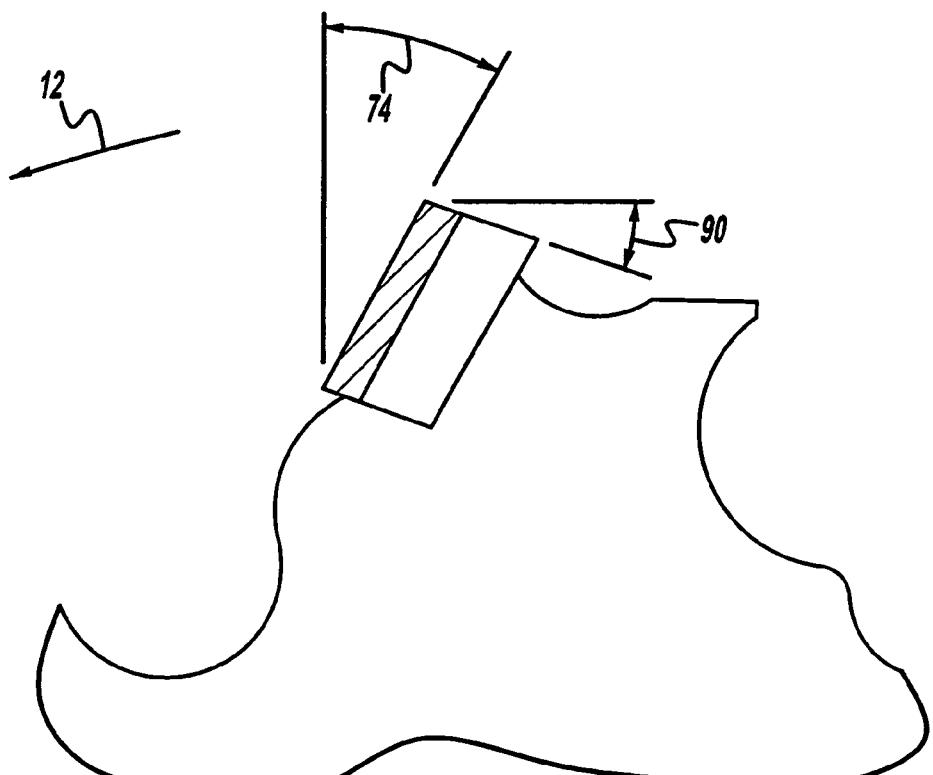
FIG. 13 is a side elevational schematic view of the tip of FIG. 12A attached to a saw blade of the present invention in which the tip is oriented at a negative hook angle, and in which the top clearance angle is created by the orientation of the tip relative to the saw blade blank.

FIGS. 12A and 13 illustrate another embodiment of the saw blade tip of the present invention in which all of the relief angles have either been formed in the tip prior to its connection to the saw blade blank, or created by the predetermined attitude of the tip when secured in place on the saw blade blank. As shown in FIG. 12A, even the tangential relief angles 100 can be formed in this manner. FIG. 13 shows such a tip in place on the saw blade.

The above-described embodiments, of course, are not to be construed as limiting the breath of the present invention. Modifications and other alternative constructions will be apparent which are within the spirit and scope of the invention as defined in the appended Claims.

What is claimed is:

1. A saw blade for cutting fiber cement, comprising:
   a circular saw blade blank defining a circumferential rim, and a plurality of gullets formed in said rim and said gullets adjacent a plurality of saw tip shoulders formed in said rim;
   a saw blade tip mounted on each saw tip shoulder; and
   a kerf chip and dust minimizer formed in said rim, said minimizer including at least one radially extending member adjacent a plurality of radially recessed members, said minimizer located proximate each gullet.

2. The saw blade claimed in claim 1, wherein each said minimizer includes a plurality of radially-extending hills and recessed valleys formed in said rim.

3. The saw blade claimed in claim 2, wherein:
   the rim defines an edge;
   the hills are located at equally radial distances above said edge; and
   the valleys are located at equal radial distances below said edge.

4. The saw blade claimed in claim 3, wherein the hills and valleys are substantially semi-circular in profile.

5. The saw blade claimed in claim 4, wherein the radii of said hills and valleys are substantially equal.

6. The saw blade claimed in claim 5, wherein the centers of said substantially semi-circular hills and valleys are located substantially radially equidistantly below and above, respectively, said edge.

7. The saw blade claimed in claim 6, wherein said edge lies substantially along an arc.

8. The saw blade claimed in claim 6, wherein said radii equal about 0.050 inches.

9. The saw blade claimed in claim 2, wherein each minimizer includes at least four valleys and three peaks.

10. The saw blade claimed in claim 2, wherein each minimizer precedes each tip shoulder in the direction of cut.

11. The saw blade claimed in claim 10, wherein each gullet is located between each said minimizer and said tip shoulder.

12. The saw blade claimed in claim 2, wherein each gullet is substantially semicircular in profile.

13. The saw blade claimed in claim 12, wherein the gullet center is located radially within the rim.

14. The saw blade claimed in claim 13, wherein the rim is located about 91 mm from the center of the blade, and the gullet centers are located about 89 mm from the center of the blade.

15. The saw blade claimed in claim 12, wherein the radii of the gullets is about 8 mm.

16. The saw blade claimed in claim 2, wherein a PCD/carbide tip is mounted on each shoulder at a predetermined hook angle.

17. The saw blade claimed in claim 16, wherein the tip hook angle lies in the range of from about minus 7 to about plus 10 degrees.

18. The saw blade claimed in claim 17, wherein the hook angle is negative.

19. The saw blade claimed in claim 18, wherein the hook angle is about minus 5 degrees.

20. The saw blade claimed in claim 18, wherein there are six sets of minimizers, gullets, and PCD tips spaced circumferentially equidistantly around the rim.

* * * * *